United States Patent [19]

Gramlich

[11] Patent Number: 5,826,025
[45] Date of Patent: Oct. 20, 1998

[54] SYSTEM FOR ANNOTATION OVERLAY PROXY CONFIGURED TO RETRIEVE ASSOCIATED OVERLAYS ASSOCIATED WITH A DOCUMENT REQUEST FROM ANNOTATION DIRECTORY CREATED FROM LIST OF OVERLAY GROUPS

[75] Inventor: Wayne C. Gramlich, Sunnyvale, Calif.

[73] Assignee: Sun Microsystems, Inc., Palo Alto, Calif.

[21] Appl. No.: 525,980

[22] Filed: Sep. 8, 1995

[51] Int. Cl.$^6$ ........................................................ G06F 3/00
[52] U.S. Cl. ............................................ 395/200.47; 707/4
[58] Field of Search ........................................ 395/200

[56] References Cited

U.S. PATENT DOCUMENTS

| | | | |
|---|---|---|---|
| 5,239,466 | 8/1993 | Morgan et al. | 395/773 |
| 5,613,134 | 3/1997 | Lucus et al. | 395/788 |

OTHER PUBLICATIONS

Charles Brooks, et al., Application–Specific Proxy Servers as HTTP Stream Transducers (Dec. 11, 1995) World Wide Web Journal, Issue One pp. 539–548.

Charlie Brooks, Oreo Shell Architecture and Design (Dec. 9, 1994) OSF Research Institute, two pages.

Charlie Brooks, OSF RI World–Wide Web Agent Toolkit (OreO) (Apr. 26, 1995) OSF Research Institute, two pages.

Roscheisen, et al., Beyond browsing: shared comments, SOAPs, trails, and on–line communities (Apr. 1995) Computer Networks and ISDN Systems, vol. 27, No. 6, pp. 739–749.

LaLiberte, et al., A protocol for sdcalable group and public annotations (Apr. 1995) Computer Networks and ISDN Systems, vol. 27, No. 6, pp. 911–918.

IBM Technical Disclosure Bulletin: Creating Distributed Document Folders In a Collaborative Viewing Session (1 Sep. 1995) vol. 38, No. 9, p. 189.

Hypermedia Documents using a server in a collaborative session, IBM Technical Disclosure Bulletin, pp. 335–336, Jul. 1995.

*Primary Examiner*—Thomas C. Lee
*Assistant Examiner*—Anderson I. Chen
*Attorney, Agent, or Firm*—Douglas J. Crisman; Flehr Hohbach Test Albritton & Herbert LLP

[57] ABSTRACT

A system and method for providing annotation overlays from diverse sources of commentary for World-Wide Web documents is disclosed. Sources of commentary contribute annotation overlays regarding particular documents on the World-Wide Web. The annotation overlays from a particular source are stored on one or more overlay servers, which are connected to the Web. A user of a Web browser opens an annotation proxy server between the Web browser and the Web servers that intercepts all documents retrieved by the Web browser and merges with the retrieved documents commentary from sources designated by the user of the Web browser that refer to the requested documents. Multiple annotation overlay proxies can be serially connected. The annotation proxy can perform the merge operation by first creating a local annotation directory of annotation overlays from sources designated by the user then, when the user requests a document, merging with the requested document information only from the annotation directory. Alternatively, the annotation proxy can perform the merge operation on the fly by pulling the annotation overlays directly from the Web servers without the use of a local annotation directory.

24 Claims, 7 Drawing Sheets

┌─────────────────────────────────────┐ ⟵ 333
│ Files can be real or synthesized; this means that
│ . . . not feasible.  **Unfortunately, there is no
│ way to tell the difference between
│ synthesized and real files; this makes it
│ extremely difficult to reliably cache HTML
│ documents using the CERN server . :Source
│ 1.**
│
│ . . .
│ . . .
│
│ As mentioned above, Files can be real or
│ synthesized. **Unfortunately, there is no way to
│ tell the difference between synthesized and
│ real files; this makes it extremely difficult to
│ reliably cache HTML documents using the
│ CERN server . :Source 1.** However, . . .
└─────────────────────────────────────┘

SYSTEM FOR ANNOTATION OVERLAY PROXY CONFIGURED TO RETRIEVE ASSOCIATED OVERLAYS ASSOCIATED WITH A DOCUMENT REQUEST FROM ANNOTATION DIRECTORY CREATED FROM LIST OF OVERLAY GROUPS

The present invention relates generally to computer networks, and particularly to proxy servers used to provide annotation overlays for documents stored on computer networks.

BACKGROUND OF THE INVENTION

The World-Wide Web ("WWW") links many of the servers making up the Internet, each storing documents identified by unique universal resource locators (URLs). Many of the documents stored on Web servers are written in a standard document description language called HTML (hypertext markup language). Using HTML, a designer of Web documents can associate hypertext links or annotations with specific words or phrases in a document (these hypertext links identify the URLs of other Web documents or other parts of the same document providing information related to the words or phrases ) and specify visual aspects and the content of a Web page.

A user accesses documents stored on the WWW using a Web browser (a computer program designed to display HTML documents and communicate with Web servers) running on a Web client connected to the Internet. Typically, this is done by the user selecting a hypertext link (typically displayed by the Web browser as a highlighted word or phrase) within a document being viewed with the Web browser. The Web browser then issues a HTTP (hypertext transfer protocol) request for the requested document to the Web server identified by the requested document's URL. In response, the designated Web server returns the requested document to the Web browser, also using the HTTP.

Many entities, especially corporations that allow access from corporate systems to the Web, modify this document access process by providing a firewall proxy running on a proxy server situated between the Web client running the browser and the various Web servers hosting the requested documents. In this modified situation, all HTTP requests issued by the browser and all documents returned by the Web servers simply routed through the firewall proxy, which implements a proxy server communications protocol that is a subset of the HTTP. Apart from providing a buffer between the Web client and servers, a pure firewall proxy performs no additional operations on the transferred information. Another common type of firewall proxy is a caching firewall proxy, which caches requested documents to provide faster subsequent access to those documents.

The ease of access and page design provided by the Web has proved attractive to many types of uses; e.g., individuals and corporations, who have not traditionally used the Internet. Additionally, the WWW is increasingly being used for commercial purposes, such as advertising and sales. Together, the new users and uses mean that an information explosion is occurring on the Web. With this information explosion it is becoming increasingly important that Web users be able to comment on the content of Web document, view the commentary of others, or filter information in Web pages. For example, a competitor or industry critic might wish to comment on product announcements made by another competitor, buyers of a specific service might want to access the commentary of certain critics (but not others) regarding that service and parents might wish to block their children's access to all documents classified as inappropriate by a review board with whose opinions they agree. Ideally, these features would be implemented in a manner that is compatible with existing Web browsers and the HTTP.

One system that provides a subset of these features by taking advantage of the proxy server protocol is the Open Software Foundation's World Wide Web Agent Toolkit, or OreO. OreO allows users to build personal agents that can perform filtering functions on requested documents before they are viewed using the Web browser. The agents created with OreO can be used in pipeline anywhere between a traditional Web client (i.e., Web browser) and a Web server to perform more complex and varied filtering of Web transactions. For example, a user could connect an obscenity filter in series with a violence filter to ensure appropriate Web browsing for their children. OreO makes this pipelining possible by providing agent interfaces that make each agent look like a traditional Web client on one side and a proxy server on the other.

However, because the OreO toolkit does not address the creation of source libraries of commentary associated with known commentators and critics, OreO agents are not well-suited to merge commentary by sources other than the creator of a requested document with the requested document. Moreover, OreO agents can only perform filtering by parsing all requested documents looking for occurrences of certain key phrases or patterns then deleting or replacing those key phrases or patterns. Clearly then, unless a commentator creates a new agent for each new document or class of documents and makes those agents available to all interested Web users, which would be extremely unwieldy, many alternate words and phrases equivalent to the key words and phrases would be missed. Finally, because the agents are not Web documents, it would not be possible to provide overlays to comment on the changes made by a first agent without another commentator creating a second agent and making that second agent available for users to insert between the Web browser and the first agent.

Therefore, there is a need for a system that introduces a proxy server between Web servers and clients that allows parts of requested documents to be annotated, filtered, transformed or deleted before the documents are viewed with a Web browser. Unlike the OreO agent, this system should perform the aforementioned annotating, filtering, transforming and deleting based on sources of commentary associated with Web servers that might be completely unrelated to the author of the requested document. Ideally, a user should be able to indicate to the proxy server specific overlay sources to merge. Then, when the user requests a document, that request should be relayed through the proxy, which merges the requested document with overlays from the user-specified sources that reference the requested document. The resulting merged document should be viewable with any existing Web browser.

Alternatively, the system should allow a user of the proxy to direct the proxy to form a library of annotations from a specific set of sources. Then, when a user requests a document, the proxy should be able to merge comments in the library of annotations with the requested document, eliminating the need to search the Web for the appropriate annotations. Ideally, each of the overlays should have their own URL's so they could be easily annotated by other commentators.

SUMMARY OF THE INVENTION

In summary, the present invention is a system and method for merging annotations from various sources with documents requested over the Web in such a way that the merged document is displayable by existing Web browsers.

Specifically, the present invention is a system for providing annotation overlays for documents requested over a computer network that incorporates a plurality of servers to store the documents. Each stored document has a unique document identifier and is viewable from a client computer having a browser configured to request and receive documents over the network. Features of the present invention include at least one stored overlay group associated with one of the servers. Each such overlay group encapsulates annotation overlays regarding at least one document and has a unique source identifier. Another feature of the present invention is an annotation overlay proxy (AOP), which is a software routine configured to merge a requested document from a first server with associated annotation overlays regarding the requested document from specified overlay groups. The annotation overlay proxy then relays the merged document to a receiver unit that is selected from another proxy (possibly a firewall proxy or another annotation overlay proxy) or the browser, which ultimately displays the merged document.

The present invention is also a method usable in the same type of computer network for providing annotation overlays for a requested document. As a first step, at least one stored overlay group is associated with a network document server. A merged document is then formed by merging a requested document stored on a first server with annotation overlays regarding the requested document from specific overlay groups. This merged document is then relayed to a receiver selected from another proxy or said browser.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
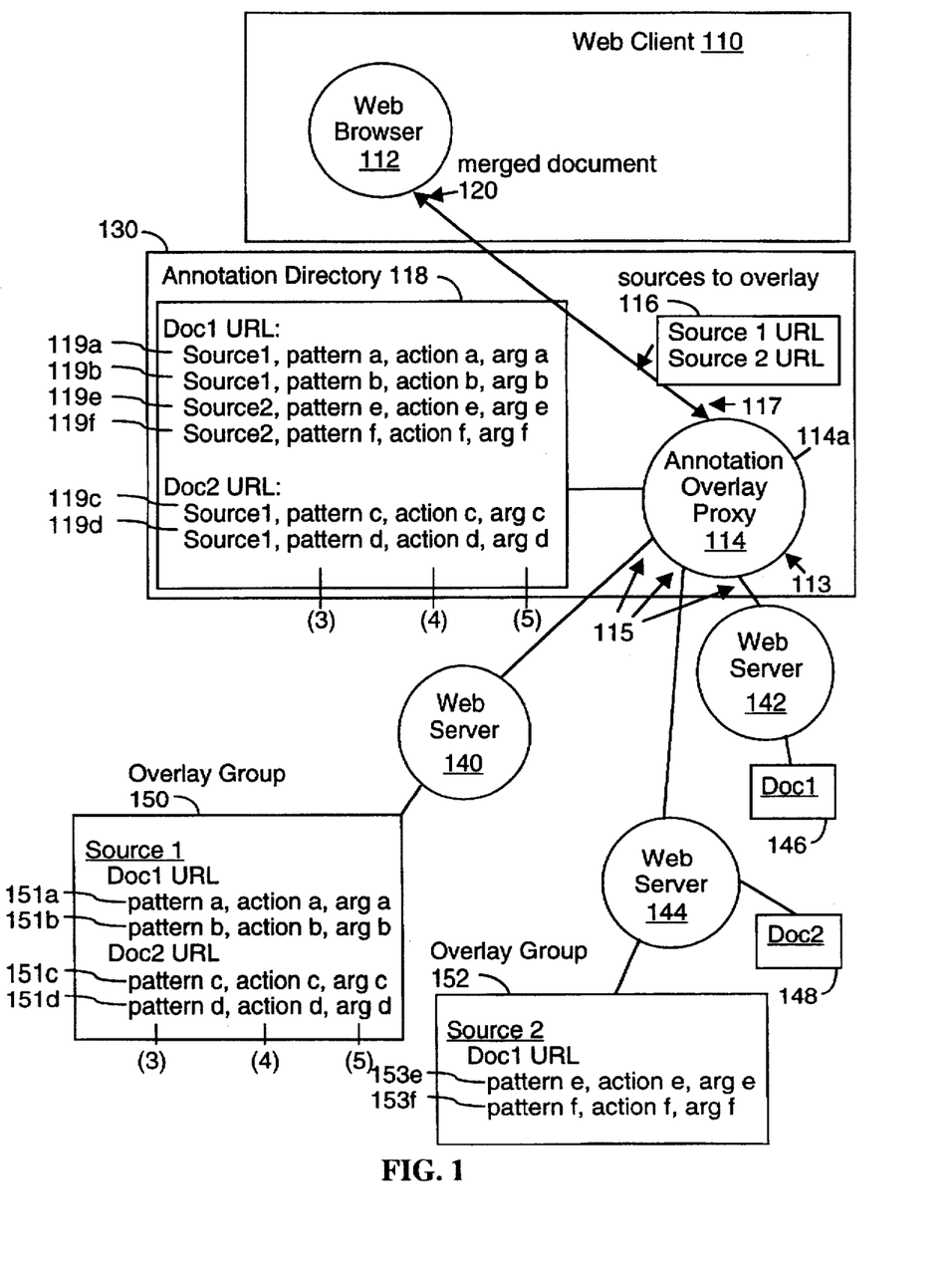
FIG. 1 is a block diagram of a preferred embodiment of the present invention.

Referring to FIG. 1, there is shown a block diagram of a preferred embodiment 100, which includes a Web client 110, a proxy server 130 coupled to the Web client 110 and Web servers 140, 142, 144, each of which are coupled to the proxy server 130.

A Web browser 112 executes in the Web client 110, while an annotation overlay proxy (AOP) 114 executes in the proxy server 130. Information output by the Web browser 112 to the AOP 114 includes an overlay sources message 116 and a requested document message 117, while the AOP 114 provides the browser 112 with a merged document 120. Data structures employed by the present invention, which can be stored in any form of electronic or magnetic memory, include an annotation directory 118 associated with the proxy server 130 and overlay groups 150, 152 associated with the Web servers 140 and 144, respectively. Each of the overlay groups 150, 152 can include multiple annotation overlays 151a–d, 153e–f that include cross-references to documents such as the documents 146 (Doc1) and 148 (Doc2), which are stored on the Web servers 142 and 144, respectively. Where large numbers of annotation overlays are associated with a particular overlay group, in the interests of scalability, that group can be split among several Web servers. The annotation directory 118 includes a plurality of annotation overlays 119a–f drawn from one or more of the overlay groups 150, 152.

The AOP 114 is coupled to the Web servers 140–44 and communicates with the Web servers 140–44 using standard Internet (TCP/IP) and WWW (HTTP) protocols. The AOP 1 14 relays all commands from the Web browser 112 to the Web servers 140–44 and receives from the Web servers a copy of the requested document 115. Actions of the AOP 114 are directed by local AOP procedures 114a and programs 113.

Please note that the numbers of components shown in FIG. 1 are merely exemplary. Also, the preferred embodiment depicted in FIG. 1 is a generic configuration intended to illustrate the basic principles of the present invention. Consequently, the following descriptions of the preferred embodiment are applicable to other configurations of the elements shown, including a configuration where the annotation directory 118 and the annotation overlay proxy 114 are resident in the Web client 110. Having set out the elements of the present invention, these elements are now described in greater detail. The following descriptions, while general, will in places be directed to the situation where a user has issued a request to view the document 146, which is associated with the Web server 142.

A. Web Browser:

The Web browser 112, which displays the merged document 120, is functionally identical to prior art Web browsers. Thus, as set out in the background section, a user of the Web browser 112 accesses a document 146 or 148 stored on the Web by first selecting a hypertext link (i.e., a highlighted word or phrase) within a document currently being displayed by the Web browser 112. Alternatively, a user can issue a document request by entering the desired document's URL in the Web browser. Similarly to existing browsers, the Web browser 112 acts on a user's document request by issuing a HTTP document request message 117 specifying the URL of the requested document. Unlike existing browsers, the browser 112 issues the document request message 117 to the AOP 114, rather than to a firewall proxy or to a group of Web servers. However, in all respects, the HTTP document request message 117 is identical to one issued by existing browsers.

The Web browser 112 also issues an HTTP sources message 116 to the AOP 114. This is a new message (i.e., a message not currently used by existing Web browsers) that specifies the URLs of the overlay groups containing information to be merged by the AOP 114 with the document identified in the document request message 117. For example, in FIG. 1, the sources message 117 indicates that the user wants to view annotation overlays from overlay groups 150 and 152, corresponding to Sources 1 and 2, respectively. This message can be issued by the Web browser 112 at any time after the AOP 114 has been initialized.

The Web browser 112 can initialize the AOP 114 in two ways. First, the user can enter the various overlay groups they wish to view on a command line from the browser 112 or even when they start the browser 112. The browser then initializes the AOP 114 and immediately issues a corresponding sources message 116, causing the AOP 114 to build the annotation directory 118. Alternatively, a list of sources can be submitted to the browser 112 using a common gateway interface (CGI), after which the browser initializes the AOP 114 and issues the appropriate sources message 116 to the AOP 114.

B. Annotation Overlay Processor (AOP):

The AOP 114, like any other proxy (e.g. a firewall proxy), communicates with entities connected to the Web, such as the Web client 110 or the Web servers 140–42, using the standard HTTP proxy server communications protocol. All functions of the AOP 114 are directed by a set of local AOP procedures 114a. Like a firewall proxy, much of the AOP's job involves merely passing along messages between the Web browser 112 and the Web servers 140–44. For example, upon receiving a HTTP document request message 117 from the Web browser 112, the AOP 114 simply relays that message to the Web servers 140–44, the appropriate one of which returns the requested document.

However, in contrast to a firewall proxy, which acts only as a kind of glass wall between the Web client 112 and servers 140–144, the AOP 114 can also transform the data being returned by the Web servers 140–144 to the Web browser 112. In the preferred embodiment illustrated in FIG. 1, this transformation involves the AOP 114 merging a requested document returned by one of the Web servers 140–44 with annotation overlays 119 from the annotation directory 118 that are associated with the requested document.

The AOP 114 builds an annotation directory 118 by searching the Web servers 140–44 for all annotation overlays contributed by the sources, or overlay groups, designated by the Web browser 112 in an HTTP sources message 116, and then storing those annotations in the annotation directory 118 as annotation overlays 119. Thus, in FIG. 1, the annotation directory 118 includes all annotations from Source 1 (overlay group 150) and Source 2 (overlay group 152), which were specified in the message 116. Generally, the AOP 114 builds the annotation directory 118 only upon receiving the HTTP sources message 116.

Each annotation overlay 119 has five fields: (1) document URL, (2) source, (3) pattern, (4) action and (5) arg (short for argument), which respectively tell the AOP 114:

(1) the URL of the document to which the annotated pertains;

(2) which source contributed the annotation overlay;

(3) what specific part (or pattern) of the returned document the overlay pertains to;

(4) the action to take with respect to the pattern; and (5) any additional information to associate in the merged document with the pattern. This additional information can include text or graphics to be inserted in the merged document or a designation of a "type" annotation, such as grammar error ("gr"), spelling error ("sp"), "agree", or "disagree".

To promote efficient retrieval of overlays, the AOP 114 orders the annotation overlays 119 on the URL of the annotated documents, although any other ordering of the overlays 119 is possible. These fields will be described in greater depth below.

Upon receiving the image of a requested document from a Web server responding to an HTTP document request message 117 issued by the browser 112, the AOP 114 first identifies the set of annotation overlays 119 in the annotation directory 118 that are associated with the requested document's URL. For example, assuming that the document requested and returned was the document 146, this set would be the annotation overlays 119a,b,e,f (FIG. 1). This task is made particularly easy in the preferred embodiment, where all annotation overlays 119 are organized by document URL. The AOP 114 then creates the merged document 120 by transforming the returned image 115 of the requested document 146 according to the information from the annotations 119a,b,e,f. This transformation is effected by the AOP 114 adding HTML-formatted content to the merged document 120 so that the annotations are seamlessly integrated with the requested document and viewable using existing Web browsers such as the browser 112.

Figure 2:
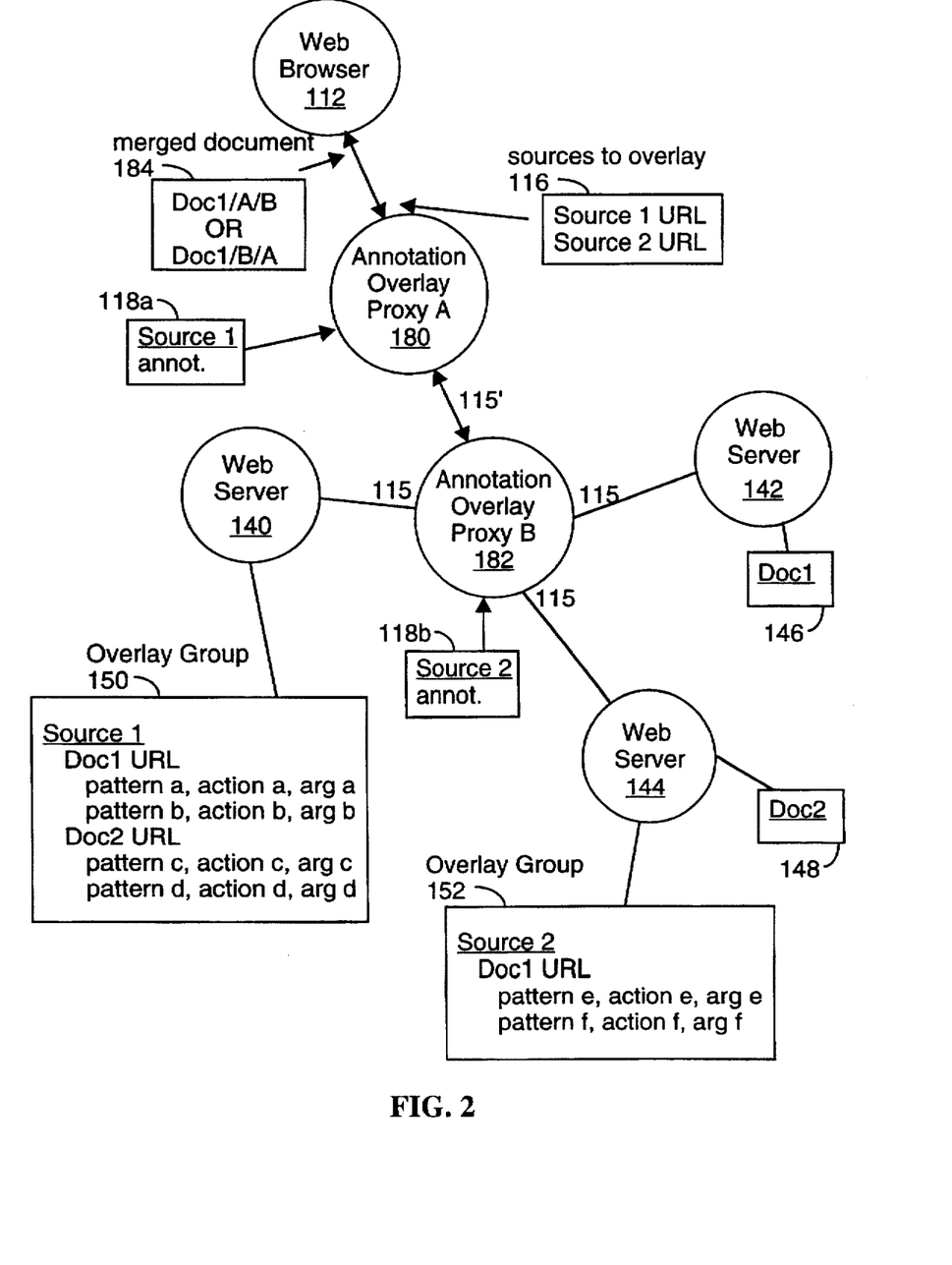
FIG. 2 is a block diagram of the preferred embodiment showing the situation where two annotation overlay proxies are connected in series.

In the preferred embodiment, AOPs can be serially connected. Such an arrangement is shown in FIG. 2, where two AOPs 180, 182 are connected in series, with the AOP 180 being linked to the Web browser 112 and the AOP 182 to the Web servers 140–44. As in FIG. 1, each AOP has access to an annotation directory, 118a and 118b containing annotations derived from sources specified by a user using the HTTP sources message 116. However, unlike the arrangement shown in FIG. 1, the annotation directories 118a and 118b include annotation overlays only from Source 1 and 2, respectively. The need to serially connect AOPs can arise in several situations, two of which are now described.

In a first situation, the annotation overlays from Source 1 and 2 might be formatted differently; consequently, the AOPs 180, 182 are specialized to read the annotation overlays from Sources 1 and 2, respectively. When the user asks for source information from diverse sources, such as Sources 1 and 2, the Web browser 112 opens as many different types of AOP as necessary to handle the different annotations. The merged document 184 returned to the Web browser 112 is then created in two steps. First, the AOP 182 merges the annotations from Source 2 with the returned document 115, then the AOP 180 merges the annotations from Source 1 with the intermediate document 115'.

A second situation where two AOPs are serially connected is where a source of annotations, such as Source 1, largely provides commentary on annotations from another source, such as Source 2. This is possible in the preferred embodiment as each annotation overlay has an associated URL that corresponds to the unique reference numbers 119a,b,e,f; 151a–d and 153e–f. When this situation arises, two AOPs are created so that the annotations from Source 1 are merged only after all of the annotations from Source 2.

C. Overlay Groups

The same type of overlay information provided in the annotation directory 118 is also provided by the overlay groups 150, 152, which, as set out above, are the original sources for the annotation overlays copied by the AOP 114 to the annotation directory 118. The only real difference between the overlay groups 150, 152 and the annotation directory 118 is that the overlay groups contain annotations for a multiplicity of documents contributed by a single source rather than a collection of annotations from a set of designated sources (i.e., the sources designated to the AOP 114 using the sources message 116). Consequently, the overlay groups are organized differently from the annotation directory.

In the preferred embodiment, each annotation overlay group 150, 152 corresponds to a single source (i.e., Source 1 and Source 2, respectively) and is formatted as shown in Table 1.

TABLE 1

```
document_url 1
    pattern a, action a
        arg a
    pattern b, action b
        arg b
    . . .
document_url 2
    pattern c, action c
        arg a
    pattern d, action d
        arg b
    . . .
document_url 3
    pattern e, action e
        arg e
    . . .
document_url 4
    pattern e, action e
        arg e
```

In this representation, each document_url corresponds to a document URL in the annotation directory 118 or overlay group 150, 152 (FIG. 1). The other information fields: pattern (3), action (4) and arg (5), are the same as for a record 119, 151, 153 in the annotation directory 118 or overlay groups 150, 152, respectively.

For example, the overlay group 150 (FIG. 1) includes four annotation overlays 151a–d provided by Source 1. Of these overlays, the first two, 151a–b, pertain to the document 146 (Doc 1), so they are included under a heading referencing the URL of Doc1. Similarly, the second two overlays 151c–d, pertain to the document 148 (Doc2) so they reference the URL of Doc2. The overlay group 152 is formatted similarly to the overlay group 150 and includes annotation overlays 153e–f provided by Source 2 that are associated only with the document 146 (Doc1).

In the preferred embodiment, the overlay groups 150, 152 are written in HTML. At all times document URLs are maintained in alphabetically sorted order. For example, some appropriate HTML for the overlay document of Table 1 is shown in Table 2.

TABLE 2

```
<UL>
    <LI>    document_url 1
        <DL>
            <DT>    pattern a, action a
            <DD>    arg a
            <DT>    pattern b, action b
            <DD>    arg b
            . . .
        </DL>
    <LI>    document_url 2
        <DL>
            <DT>    pattern c, action c
            <DD>    arg a
            <DT>    pattern d, action d
            <DD>    arg b
            . . .
        </DL>
```

TABLE 2-continued

```
    <LI>    document_url 3
        <DL>
            <DT>    pattern e, action e
            <DD>    arg e
            . . .
        </DL>
    <LI>    document_url 4
        <DL>
            <DT>    pattern e, action e
            <DD>    arg e
            . . .
        </DL>
    . . .
</UL>
```

In Table 2, the terms between the paired "<" and ">" symbols are standard HTML commands, or tags, which allow the AOP to parse annotation overlays for the various fields. The tags used in Table 2 have the following meanings:

| | |
|---|---|
| <UL> | begin unordered list; |
| <LI> | list item; |
| </UL> | end unordered list; |
| <DL> | begin definition list; |
| <DT> | definition list term; |
| <DD> | definition of prior definition list term; and |
| </DL> | end definition list. |

Having described the structure of the annotation directory 118 and the overlay groups 150, 152, the fields of the annotation overlays, common to both the annotation directory and the overlay groups, are now described in detail.

D. Annotation Overlays:

In the preferred embodiment, the AOP 114 is designed to read annotation overlays that are written in HTML, which allows authors to create annotations using widely available HTML authoring tools. Alternatively, special annotation authoring tools could be provided.

Typically, overlay authors will place annotation overlays on the Web according to one of many authoring models. For example, in a cooperative (coop) model, a group of individuals contribute annotation overlays directly to one or more overlay groups 150, 152 associated with a cooperative to which the authors belong. For example, members of different political parties might contribute overlays to the overlay groups 150 and 152, respectively. In a magazine model, paid authors submit annotations to a centralized editor who then edits and publishes the authors' annotation overlays in an overlay group(s) managed by the editor. In this magazine model, it is envisioned that publishers of overlay groups will sell subscriptions or, like commercial broadcasters, advertising, to cover the costs of publication.

As described above and shown in FIG. 1, in addition to specifying the document being annotated and the source of the annotations, each annotation overlay 119, 151, 153 includes the following information fields that allow the AOP 114 to perform the correct transformation on the correct part of the requested document:

pattern (3);

action (4); and arg (5).

Each of these fields is described below in reference to the exemplary annotation overlay shown in Table 3, which represents a member of an overlay group such as the group 150. Please note that field 2 from the annotation overlays 119 is missing because source (2) is synonymous with the overlay group identifier. E.g., the overlay group 150 contains only annotation overlays authored by Source 1.

TABLE 3

| (1) | http://info.cern.sh/hypertext/WWW/Daemon/User |
|---|---|
| (3)(4) | 'Files can be real or synthesized' [Insert after sentence] |
| (5) | Unfortunately, there is no way to tell the difference between synthesized and real files; this makes it extremely difficult to reliably cache HTML documents using the CERN server. |

In the example of Table 3, the identifier field (1) indicates the URL (or document URL) of one respective document to be annotated. The remaining fields (3)–(5) represent the pattern, action and arg for the same annotation overlay. We proceed to describe fields (3), (4) and (5).

1. Annotation Overlays—Pattern Field

A pattern (3) is a pattern of words or pixels in the requested document that the AOP 114 must operate on. The pattern field is necessary as the document URL in an annotation overlay does not provide fine location within a document but merely a pointer to the document as a whole. In the preferred embodiment, the pattern syntax consists of a list of words or pixels making up the pattern set off by balanced single quotes. For example, in the illustration above, the pattern the AOP 114 must search for in the document identified by the document URL http://info.cern.sh/hypertext/WWW/Daemon/User is: 'Files can be real or synthesized'. The remaining fields (4) and (5) tell the AOP 114 what actions to take with regard to occurrences in the corresponding document.

2. Annotation Overlays—Action Field:

The action field (4) defines the action that the AOP 114 must take when merging an annotation overlay at the specified pattern in the requested document. In the preferred embodiment, this action can be selected from one of four basic operations:

| Insert | Insert the contents of the arg field into the requested document at a specified location relative to the pattern. |
|---|---|
| Delete | Delete the specified pattern or a range of words/images surrounding the specified pattern.. |
| Replace | Replace the specified pattern or a designated part of the document including the specified pattern with the contents of the arg field. |
| Run_Program | Execute the identified program, which corresponds to a routine 113 that is associated with the AOP 114. |

In addition to one of the four basic operations, the action field (4) also includes several additional parameters that specify how the action is to be implemented with respect to the pattern field (3). In the preferred embodiment, all of the arguments composing the action field follow the pattern field (3) and are enclosed in balanced square brackets. The syntax of the action field (4) is set out in TABLE 4.

TABLE 4

```
operation
    |match| insert |
    |match| delete |
```

TABLE 4-continued

```
    |match| replace |
    |match| run_program
match
    match decimal number
insert
    insert where |
delete
    delete from where to where
replace
    replace where |
run_program
    run_program program_id where |
where
    before location |
    after location
location
    document |
    section |
    paragraph |
    sentence |
    word decimal number |
```

In Table 4, the bolded terms are keywords that are used in a particular instruction. The unbolded terms represent variables or parts of an instruction. Optional parts of the action field, such as 'match' are shown enclosed in square brackets. For example, in the exemplary annotation overlay in Table 3, the entire action is: [Insert after sentence]. In this example, the operation is "insert", the where part of the instruction is "after" and the location is "sentence". The vertical bar ("|") stands for "OR"; e.g, the location field can have one value selected from document, OR section OR paragraph, etc.

The various parts of action field are defined in Table 5.

TABLE 5

| operation | As mentioned above, an operation is the action to be implemented with respect to the pattern and is selected from one of insert, delete, replace and run_program. Insert, and replace operations take a where argument, which indicates to the AOP 114 the specific part to be operated on of a document including the pattern. Delete operations take an argument of: from where to where. The run_program operation takes two arguments, program_id, which is the name of the program local to the AOP 114) to be executed and "where", which identifies the specific part of the document to be operated on. |
|---|---|
| match | A value that indicates which of multiple occurrences of the pattern the annotation overlay applies to. |
| where | As mentioned above, the where argument identifies a specific part of a document including the pattern. The where argument has two variations, before location and after location. In these variations "location" is an enumerated variable that has five values: document, section, paragraph, sentence and word, which are described below. |
| document | refers to the document containing the pattern. If preceded by before, the AOP 114 performs the operation at the beginning of the document. If preceded by after, the operation is performed at the end of the document. For example, if the annotation overlay action field were: "[insert before document]", the AOP 114 would perform the insert operation at the beginning of the designated document. |
| section | refers to the section (designated using HTTP section tags) that includes the pattern. |
| paragraph | refers to the paragraph (designated using HTTP paragraph tags) that includes the pattern. |
| sentence | refers to the sentence (determined by the AOP 114 parsing the requested document) that includes the pattern. |
| word decimal_number | refers to a specific word (the one identified by the value of the "decimal_number" variable) of the document containing the pattern. |

3. Annotation Overlays—Argument Field:

The argument field provides the contents to be inserted by the AOP 114 in the requested document at the position identified by the where argument to the insert and replace operations. For example, the exemplary annotation overlay of Table 3 instructs the AOP 115 to insert the phrase:

Unfortunately, there is no way to tell the difference between synthesized and real files; this makes it extremely difficult to reliably cache HTML documents using the CERN server after the sentence that includes the pattern:

'Files can be real or synthesized'.

Using this action field syntax, almost any type annotation operation can be specified for execution by an annotation overlay proxy such as the AOP 114.

E. Method of the Preferred Embodiment

Figure 3:
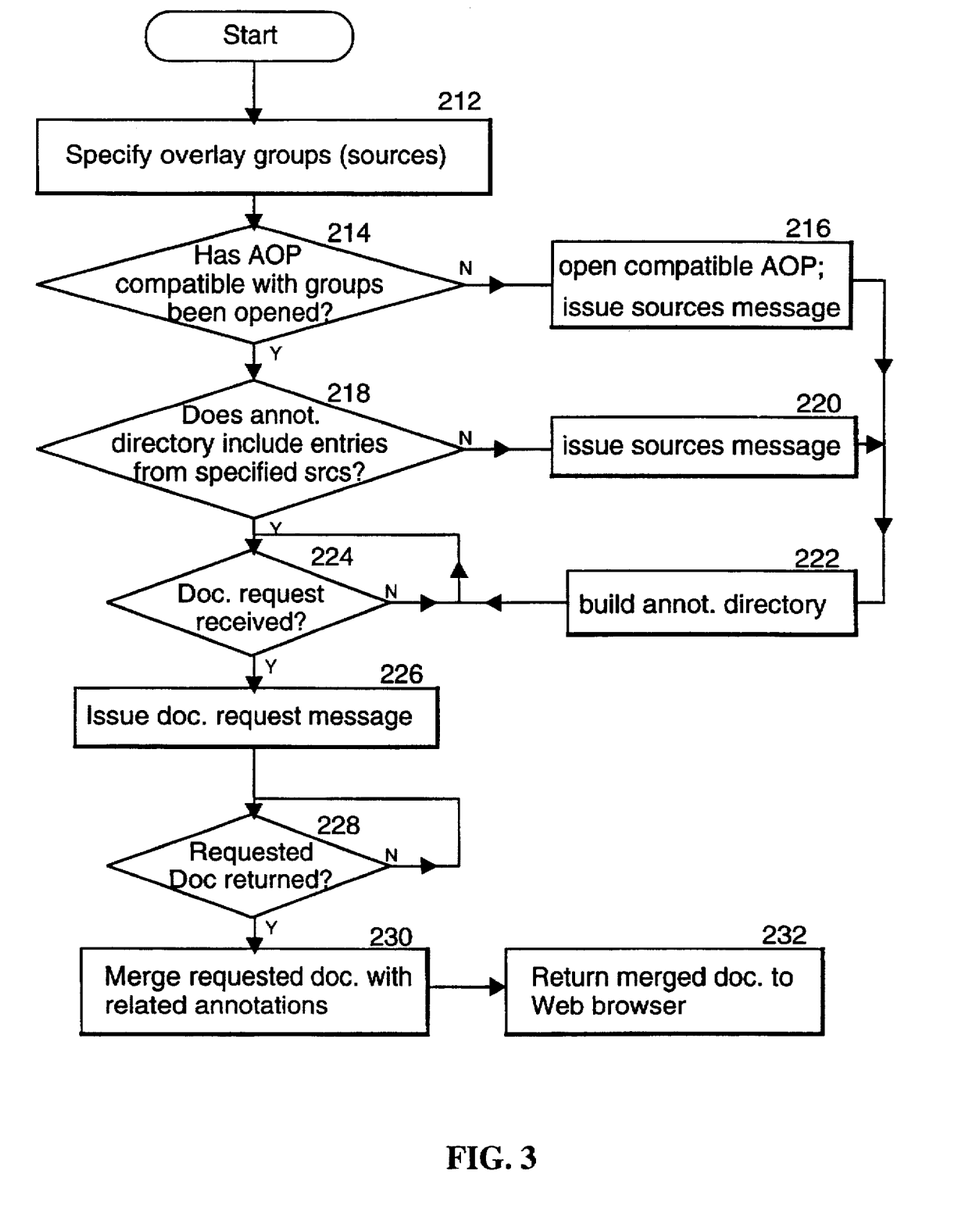
FIG. 3 is a flow chart of a preferred method for merging annotation overlays and requested documents.

Referring to FIG. 3, there is shown a flow chart of the operation of the preferred embodiment. The steps described below as being executed by the AOP 114 are executed under the direction of the local AOP procedures 114a.

As a first step, the user indicates to the browser 112 using an input device the overlay groups they wish to track (212). In response, the browser 112 determines whether it has already caused the annotation proxy server 130 to open an annotation overlay proxy that is compatible with the user-designated overlay groups (i.e., an AOP that knows how to merge annotations from the designated overlay groups with requested documents) (214). If such an AOP has not been opened (214-N), the Web browser 112 issues an open_AOP message to AOP server 130, which opens the correct type of AOP (216); the browser then issues a sources message 116 to the newly available AOP (216). If the browser had previously caused the AOP server to open a compatible AOP (214-Y), the browser determines whether the annotation directory 118 includes overlays for the overlay groups specified by the user (218); if not (218-N), the browser issues an HTTP sources message 116 to the previously-opened AOP 114 specifying the overlay groups not currently represented in the annotation directory 118 (220).

As described above in reference to FIG. 1, in response to the HTTP sources message, the AOP 114 accesses over the Web the overlay groups whose URLs match the source URLs in the sources message 116. The AOP 114 then copies all annotations from the designated overlay groups to the annotation directory 118 and orders all of the entries 119 in the annotation directory 118 by document URL (222). At this point, the AOP is initialized and waits for document request messages issued by the browser 112 (224).

Whenever the user requests a document URL while using the Web browser, the browser issues a document request message 117 to the proxy server 130 (226), which the AOP 114 passes on to the Web server storing the requested document. In response, that Web server returns the requested document to the AOP server 130. Once the requested document is returned to the proxy server 130 (228-Y), the AOP 114 creates a merged document 120 that represents a merger of the requested document and all annotation overlays from the annotation directory 118 that are associated with the requested document (230). The AOP 114 then returns the merged document 120 to the Web browser (232) for viewing.

When creating the merged document 120, the AOP 114 first copies the requested document to the merged document. The AOP 114 then adds the associated annotation overlays 119 to the merged document 120 in an order determined by the precedence of the operation associated with each respective annotation overlay 119. In the preferred embodiment, the operations' precedence order, from highest to lowest, is: insert, replace, delete and program. This precedence order is inversely related to the degree of disruption caused in the merged document 120 by a particular operation. For example, a delete operation from a source 2 (overlay group 152) overlay might delete the pattern needed for an insert operation from a source 1 (overlay group 150) overlay, but not vice versa. Any other precedence scheme could also be implemented. Of course, even given operator precedence, it is inevitable that sometimes the pattern required by an overlay is not in the merged document. When this is the case, the AOP 114 appends the annotation overlay 119 including that pattern to the merged document and links that overlay to an "unassociated_annotation" icon displayed at the beginning of the document. By selecting an unassociated_annotation icon, a user may read the corresponding annotation overlay 119 which is displayed by the Web browser 112.

When merging an overlay 119 specifying an insert operation, the AOP 114 appends the information from the arg field to the merge document, locates designated occurrences of the pattern in the document (the designated occurrences could be every occurrence or just those occurrences specified in the optional match field), then determines the position in the document relative to the designated occurrences where the information in the arg field is to be inserted. At that position, the AOP 114 adds an HTML tag(s) (or some other hyperlink indicator) to call out the annotation and links the appended information from the arg field to that tag(s). The AOP 114 also inserts HTML tags in the merged document around the pattern to convert the pattern into a hyperlink cue tied to the appended information from the arg field. When displaying the merged document, the Web browser 112 can display an icon at the insertion point, which a user can select to display the inserted text, or can directly display the inserted text at the insertion point. In either situation, by selecting the displayed pattern, the icon or the inserted text, the user can obtain information 112 about the source of the annotation overlay. Alternatively, the AOP 114 simply inserts the information from the arg field into the merged document at the location defined in the action field and adds HTML tags to the inserted text that will cause the browser 112 to highlight the inserted text when displayed.

Figure 4:
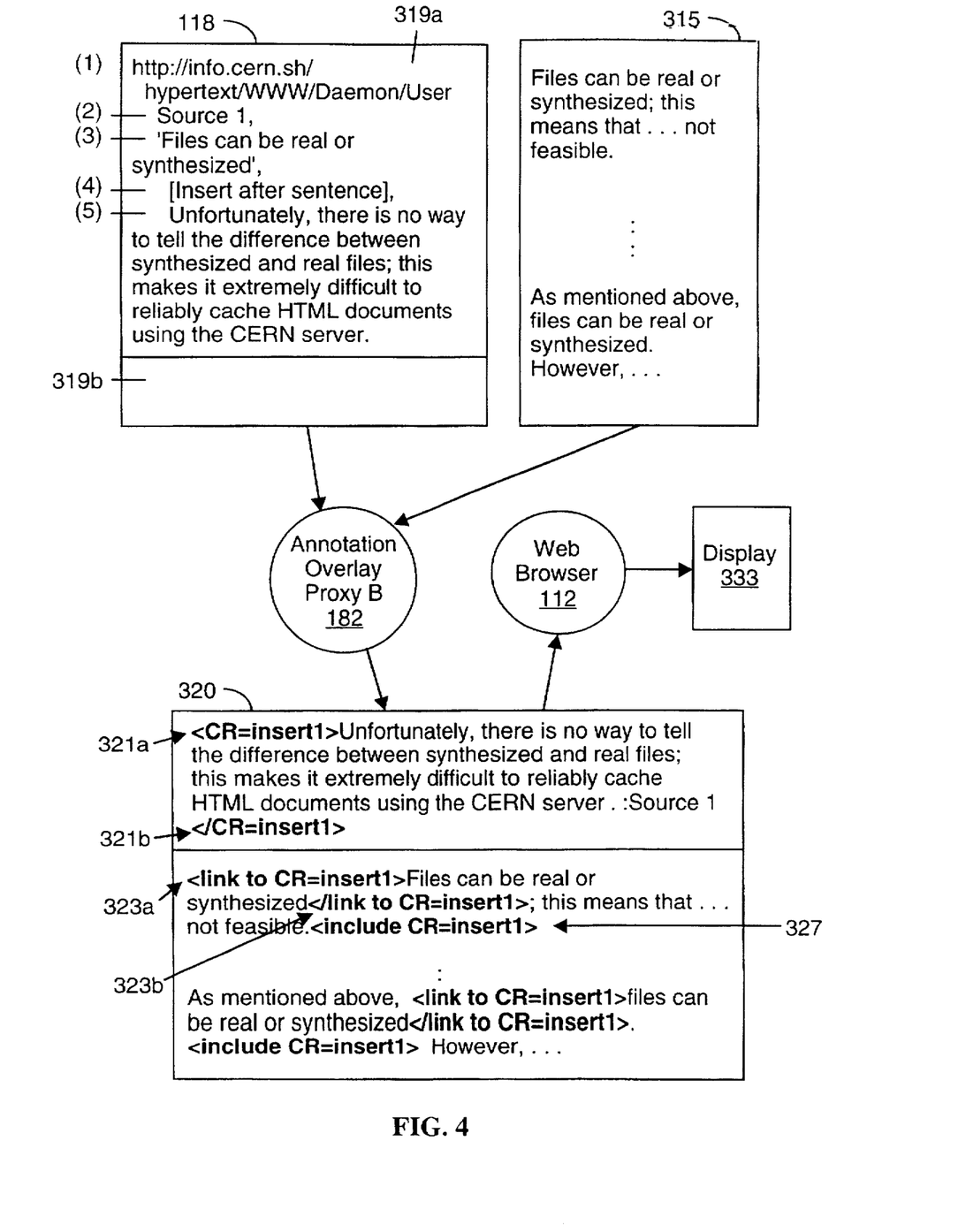
FIG. 4 is a diagram illustrating how the annotation overlay proxy merges annotations with a requested document.

For example, Referring to FIG. 4, there is shown a merged document 320 resulting from the AOP 114 merging the annotation overlay 319a from the annotation directory 118 with the requested document 315 according the first insertion method described above.

The annotation overlay 319a is derived from the one shown in Table 3; that is:

| | |
|---|---|
| (1) | http://info.cern.sh/hypertext/WWW/Daemon/User |
| (3)(4) | 'Files can be real or synthesized' [Insert after sentence] |
| (5) | Unfortunately, there is no way to tell the difference between synthesized and real files; this makes it extremely difficult to reliably cache HTML documents using the CERN server. |

As shown in FIG. 4, the AOP 114 adds the inserted text from the field (5) to the top of the merged file 320, appends to the inserted text a source identifier indicating that the text came from Source 1, and associates with the text and source information a HTML cross reference begin and end tags 321a, 321b ("<CR=insert1>") designating the inserted text as "insert1". The AOP 114 then adds HTML begin and end annotation tags 323a, 323b ("<link to CR=insert1>") to the merged file around all occurrences of the pattern, "files can be real or synthesized", which occurs at two locations in the merged document. These tags reference the inserted text designated as "insert1" and signal the Web browser to highlight the pattern when displaying the requested document. Because the operation associated with the annotation is "insert after sentence", the AOP 114 also adds an HTML tag 327 ("<include CR=insert1>") to the merged document 320 at the end of each sentence including the pattern. The tag 327 defines a hypertext link to the inserted text associated with the reference "insert1" This merged document 320 can be displayed in the browser 112 in any number of ways selected by the user of the browser. For example, the linked text might be displayed inline, or linked to an icon, displayed at the position of the HTML tag 327.

Figure 5:
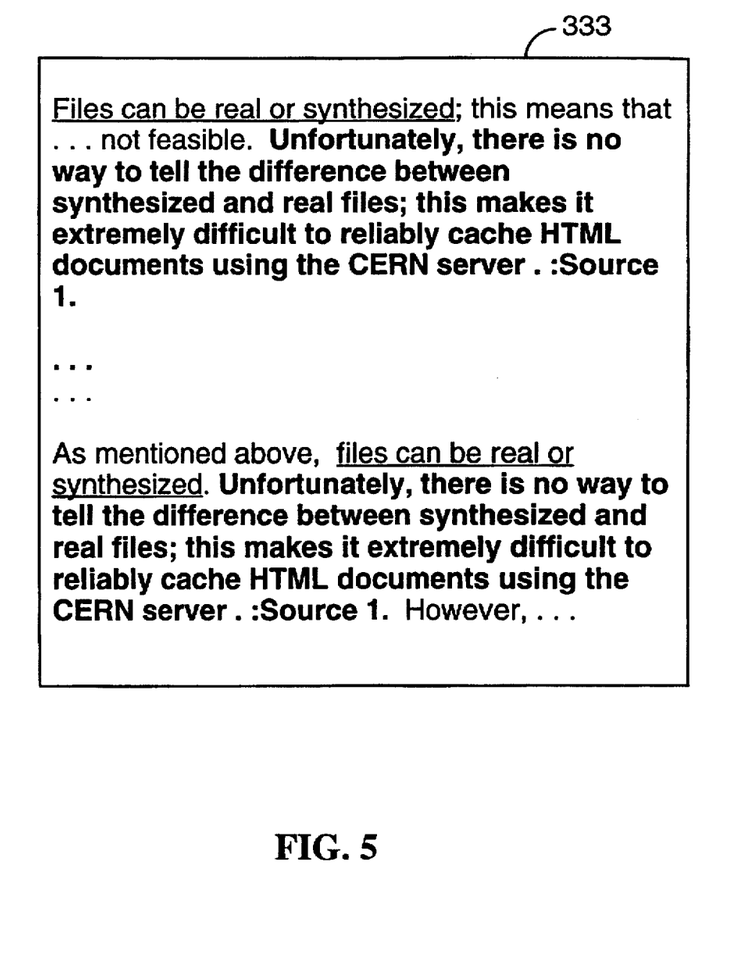
FIG. 5 is an illustration of the appearance of a merged document displayed by a web browser.

For example, FIG. 5 shows how the merged file 320 might look when the overlay 319a is displayed as an inline annotation. Note that the Web browser 112 highlights the inserted text to alert the user.

When the operation is replace, the AOP 114 locates designated occurrences of the pattern in the document, then determines the part of the document containing the designated occurrences of the pattern which is to be replaced by the phrase or image in the arg field of the respective annotation overlay. The AOP 114 then performs the required replacement operation in the merged document 120 and places HTML around the replacement text that links the replacement text to an annotation specifying the source of the overlay, which the AOP 114 appends to the merged document 120. When a user selects the highlighted replacement text displayed by the Web browser 112, the browser 112 displays the source of the replacement text (e.g., "Source 1").

When the operation is delete, the AOP 114 simply deletes the part of the merged document identified by the "from where to where" part of the delete annotation overlay.

When the operation is run_program, the AOP 114 executes on the designated part of the requested document the local filter program identified by the program_id argument from the action field of the respective annotation overlay. For example, referring to FIG. 1, the program 113 to be executed by the AOP 114 might be: translate_pgm_a or translate_pgm_b. These programs might perform operations such as summarizing, translating or decrypting the merged document 120, 320.

While the AOP 114 could process annotation overlays in any order, in the preferred embodiment, the AOP 114 processes annotation overlays in an order determined by the relative precedence of the operation specified in the action field of each respective annotation overlay. I.e., insert operations are always performed first, then replace, delete and run_program operations.

F. Alternative Embodiments

Figure 6:
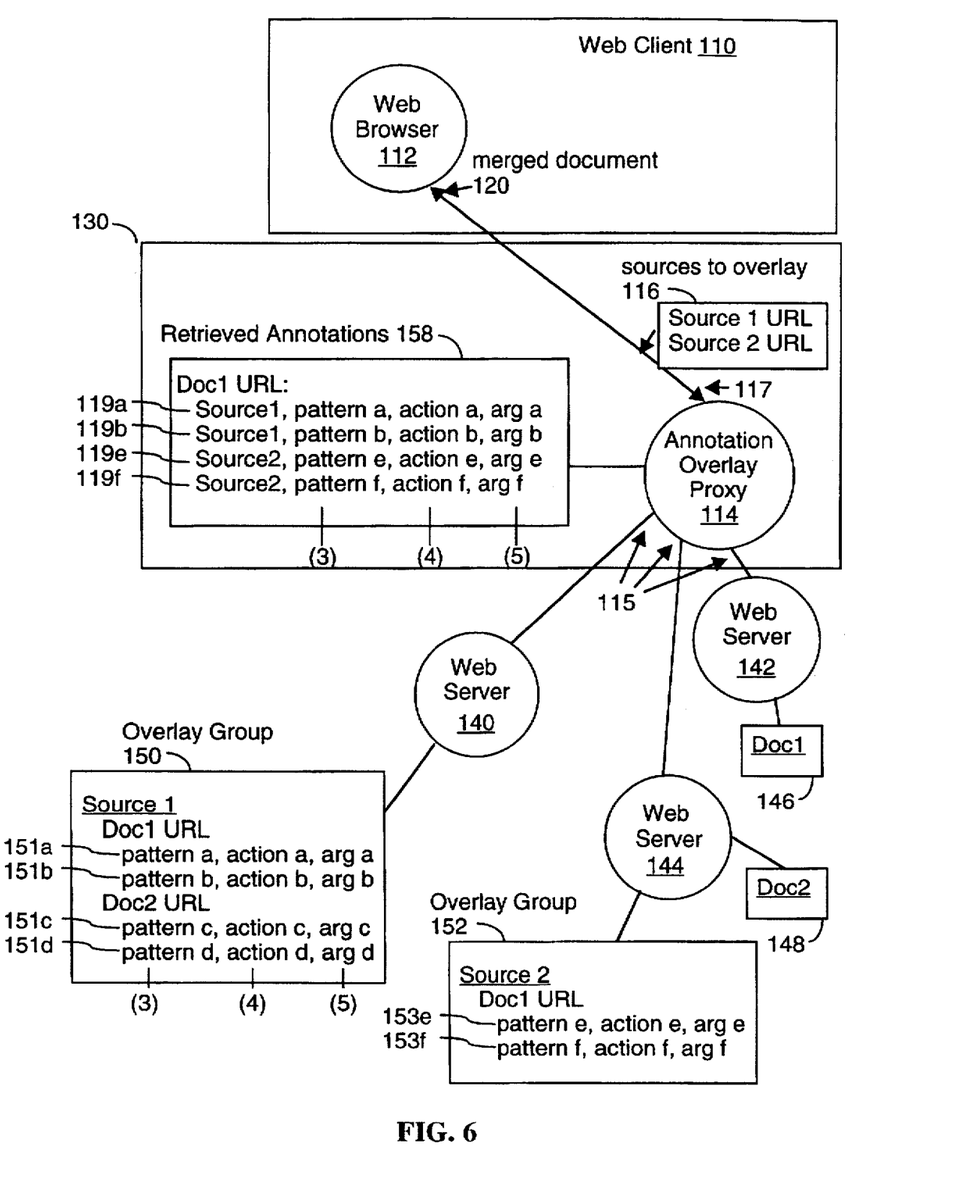
FIG. 6 is a block diagram of an alternative embodiment of the present invention where the annotation overlay proxy does not build or use the annotation directory of FIG. 1.

A first alternative embodiment is shown in FIG. 6. In this embodiment, the AOP 114 does not prepare an annotation directory 118 in advance of a Web browser request for a document stored on a Web server. Instead, the AOP 114 retrieves from the various overlay servers identified by the user network (with the sources message 117) the annotation overlays only for a particular document or documents and only upon receiving the aforementioned document request from the Web browser. The AOP 114 then temporarily stores the set of retrieved annotation overlays in memory, structured similarly to the annotation directory 118 (FIG. 1). The AOP 114 then merges the annotations with the requested document exactly as described above. The advantage of this alternative embodiment is that the AOP 114 is required to store only a small set of all of the annotation overlays stored in the preferred embodiment, which allows a user to more easily change the sources whose comments they wish to view.

Figure 7:
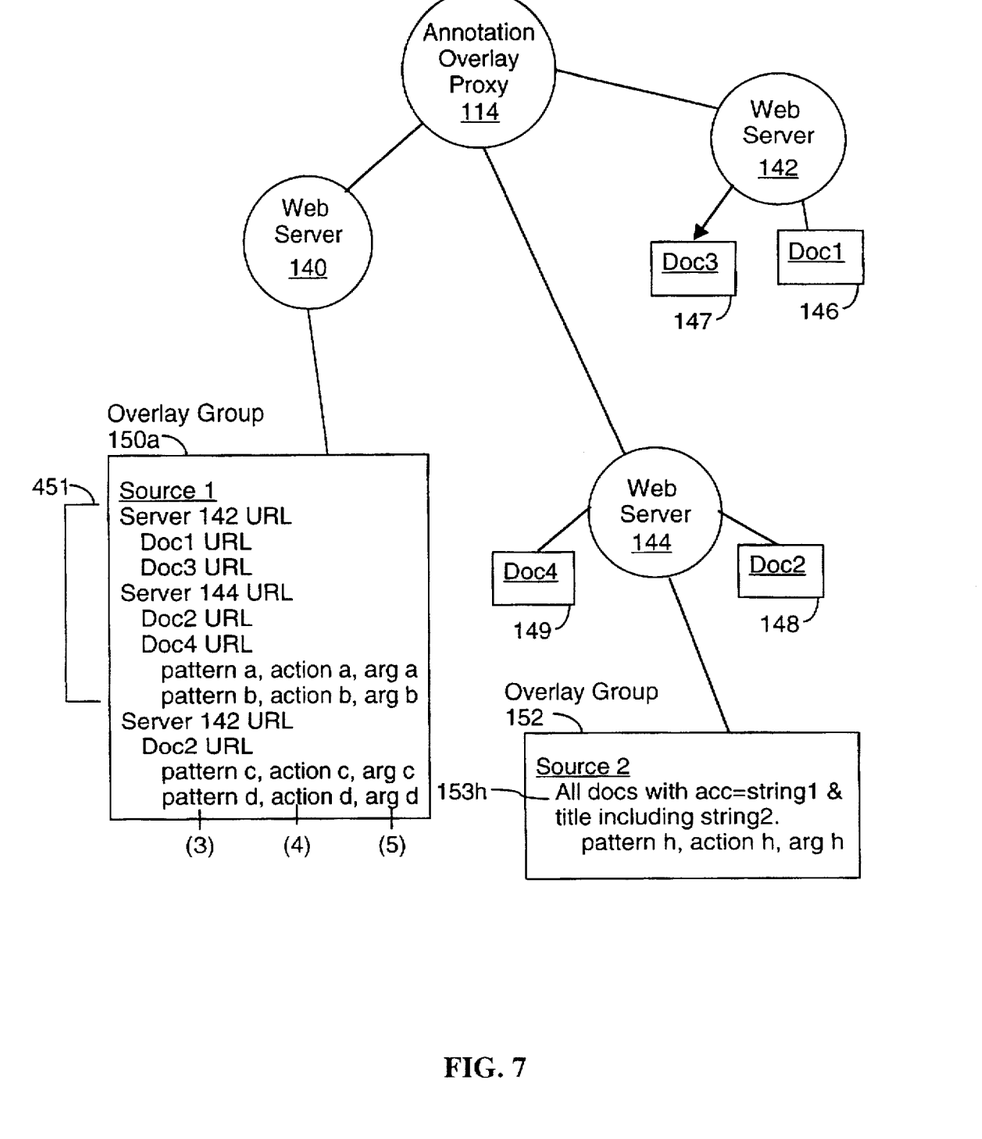
FIG. 7 is a block diagram of an alternative embodiment of the present invention where each annotation overlay can refer to one or more documents.

In another preferred embodiment, which is shown in FIG. 7, each annotation overlay, e.g., the annotation overlay 451, can refer to a range/set of documents, rather than just a single document. This type of annotation overlay is useful where a source of commentary provides global comments on an entire class of documents; e.g., the entire body of work of an author or any publication of a particular company. These annotations are structured similarly to the style of annotation employed in the preferred embodiment (FIG. 1, Table 1), but can specify plural machine URLs (designating the address of a Web server) and plural document URLs (associated with each server designated by a machine URL) for each pattern, action and arg triplet. FIG. 7 also depicts another form of annotation 153h, which can be used in the present invention. This type of annotation 153h does not name a specific document but provides a search string; e.g., "All docs with acc=string1& title including string2", that the AOP 114 matches to particular requested documents before merging the accompanying pattern, action and arg triplet.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer network incorporating a plurality of servers used to store documents, each said document having a unique document identifier, and a client computer having a browser configured to request and receive said documents over said network, a system for providing annotation overlays for a requested document, said system comprising:

at least one stored overlay group associated with one of said servers, said overlay group encapsulating annotation overlays regarding at least one of said documents, each said stored overlay group having a unique source identifier;

an annotation overlay proxy configured to form a merged document by merging said requested document from a first server with associated annotation overlays regarding said requested document from specified overlay groups and to relay said merged document to a receiver selected from another proxy or said browser; and an annotation directory associated with said annotation overlay proxy, wherein said annotation directory stores said annotation overlays from said specified overlay groups, and wherein said annotation overlay proxy is configured, in response to a document request issued by said browser, to retrieve a set of associated annotation overlays related to said requested document from said annotation directory prior to merging said set of associated annotations and said requested document;

wherein said annotation directory is created by said annotation overlay proxy, which, upon receiving a list of said specified overlay groups identified by their unique source identifiers, is configured to retrieve all of said annotation overlays from said specified overlay groups and store said retrieved annotation overlays in an electronic memory coupled to said annotation overlay proxy, said stored annotation overlays forming said annotation directory.

2. The system of claim 1, wherein at least one overlay group encapsulates a plurality of distinct annotation overlays regarding one of said documents.

3. The system of claim 1, wherein each overlay group encapsulates annotation overlays provided by a single commentator.

4. The system of claim 1, wherein at least a subset of said annotation overlays each have associated therewith data indicating with which document or documents said each annotation overlay is to be associated.

5. The system of claim 1, wherein each of said annotation overlays has an associated unique overlay identifier so that each of said annotation overlays can be annotated in same manner as said documents.

6. The system of claim 1, wherein said annotation overlay proxy is configured so as to be operable in series with other proxies, said other proxies including other said annotation overlay proxies and firewall proxies.

7. The system of claim 1, wherein said annotation overlays are defined using hypertext mark up language (HTML).

8. The system of claim 1, wherein said annotation overlay comprises:
a document id specifying a set of documents to which said annotation overlay is applicable;
a pattern in said set of documents;
an action code specifying an action to be taken by said annotation overlay proxy with regard to said pattern in said set of documents when creating said merged document; and
an argument supplying additional information to assist said annotation overlay proxy in executing said action.

9. The system of claim 8, wherein said action code further comprises:
a location field that indicates a part of said set of documents, said part being selected from a document, section, paragraph, sentence and word containing said pattern; and
a where field that indicates where, with respect to said part, said action is to be implemented.

10. The system of claim 8, wherein, when said action code is a replacement code and said requested document is within said set of documents, said annotation overlay proxy forms said merged document by substituting for each occurrence of said pattern in said requested document said additional information in a corresponding part of said merged document.

11. The system of claim 8, wherein, when said action code is an insertion code and said requested document is within said set of documents, said annotation overlay proxy associates said additional information with each occurrence in said merged document of said pattern.

12. The system of claim 8, wherein, when said action code is a deletion code and said requested document is within said set of documents, said annotation overlay proxy prevents from appearing in said merged document any occurrence of said pattern.

13. The system of claim 8, wherein, when said action code is a program code and said requested document is within said set of documents, said annotation overlay proxy executes a filter program on each occurrence of said pattern in said requested document so that a corresponding part of said merged document includes a transformation of said pattern operated on by said filter program.

14. In a computer network incorporating a plurality of servers used to store documents, each said document having a unique document identifier, and a client computer having a browser configured to request and receive said documents over said network, a method for providing annotation overlays for a requested document, said method comprising the steps of:
associating at least one stored overlay group with one of said servers, said overlay group encapsulating annotation overlays regarding at least one of said documents, each said stored overlay group having a unique source identifier;
forming a merged document by merging said requested document from a first server with associated annotation overlays regarding said requested document from specified overlay groups; and
relaying said merged document to a receiver selected from a proxy or said browser,
wherein all said requested documents are routed through an annotation overlay proxy, said annotation overlay proxy performing said merging and said relaying steps, and, before said merging step, forming an annotation directory, wherein said annotation directory stores said annotation overlays from said specified overlay groups;
said annotation overlay proxy forming said annotation directory by:
receiving a list of said specified overlay groups identified by their unique source identifiers;
retrieving all of said annotation overlays from said specified overlay groups; and
storing said retrieved annotation overlays in an electronic memory coupled to said annotation overlay proxy.

15. The method of claim 14, wherein said annotation overlay comprises:
a document id specifying a set of documents to which said annotation overlay is applicable;
a pattern in said set of documents;
an action code specifying an action to be taken with respect to said set of documents when forming said merged document; and
an argument supplying additional information for said action code.

16. The method of claim 15, wherein, when said action code is a replacement code and said requested document is within said set of documents, said action comprises substituting in said merged document said additional information for parts of said requested document having a specified relationship to said pattern.

17. The method of claim 15, wherein, when said action code is an insertion code and said requested document is within said set of documents, said action comprises inserting in said merged document said additional information at a position set wherein each position in said position set has a specified relationship to said pattern.

18. The method of claim 15, wherein, when said action code is a deletion code and said requested document is within said set of documents, said action comprises preventing from appearing in said merged document any occurrence of a part of said requested document having a specified relationship to said pattern.

19. The method of claim 15, wherein, when said action code is said program code and said requested document is within said set of documents, said action comprises executing a specified filter program on parts of said requested document having a specified relationship to said pattern so that corresponding parts of said merged document include a transformation of said parts operated on by said filter program.

20. A computer-readable memory that can be used to direct a computer to merge stored annotation overlays with documents stored on a computer network to which said computer is coupled, said computer-readable memory comprising:

(1) an annotation overlay including:
   (a) a document id specifying a set of documents to which said annotation overlay is applicable;
   (b) a pattern in said set of documents;
   (c) an action code specifying an action to be taken by said computer with regard to said pattern in said set of documents when creating said merged document; and
   (d) an argument supplying additional information to assist proxy procedures in executing said action with regard to said pattern;

(2) said proxy procedures for forming a merged document by merging said annotation overlay with a requested document within said set of documents, said merging including performing said action specified by said action code; and (3) an annotation directory associated with said proxy procedures, wherein said annotation directory stores said annotation overlays from specified overlay groups, and wherein said proxy procedures are configured, in response to a document request issued by said computer, to retrieve a set of associated annotation overlays related to said requested document from said annotation directory prior to merging said set of associated annotations and said requested document;

wherein said annotation directory is created by said proxy procedures, which, upon receiving a list of said specified overlay groups identified by their unique source identifiers, are configured to retrieve all of said annotation overlays from said specified overlay groups and store said retrieved annotation overlays in an electronic memory coupled to said proxy procedures, said stored annotation overlays forming said annotation directory.

21. The computer readable memory of claim 20, wherein, when said action code is a replacement code and said requested document is within said set of documents, said proxy procedures substitute in said merged document said additional information for parts of said requested document having a specified relationship to said pattern.

22. The computer readable memory of claim 20, wherein, when said action code is an insertion code and said requested document is within said set of documents, said proxy procedures insert in said merged document said additional information at a set of insertion points wherein each of said insertion points has a specified relationship to said pattern.

23. The computer readable memory of claim 20, wherein, when said action code is a deletion code and said requested document is within said set of documents, said proxy procedures prevent from appearing in said merged document any occurrence of a part of said requested document having a specified relationship to said pattern.

24. The computer readable memory of claim 20, wherein, when said action code is said program code and said requested document is within said set of documents, said proxy procedures execute a specified filter program on parts of said requested document having a specified relationship to said pattern so that a corresponding part of said merged document includes a transformation of said part operated on by said filter program.

* * * * *